(12) United States Patent
Yang et al.

(10) Patent No.: US 7,399,799 B2
(45) Date of Patent: Jul. 15, 2008

(54) FLAME-RETARDANT POLYESTER POLYMER DYEABLE WITH CATIONIC DYE, METHOD OF PRODUCING THE SAME, AND COPOLYESTER FIBER USING THE SAME

(75) Inventors: Seung-Cheol Yang, Gyeonggi-do (KR); Eung-Soo Kim, Seoul (KR); Yang-Kuk Son, Gyeonggi-do (KR); Ik-Hyeon Kwon, Seoul (KR)

(73) Assignee: Hyosung Corporation, Seoul (KR)

( * ) Notice: Subject to any disclaimer, the term of this patent is extended or adjusted under 35 U.S.C. 154(b) by 578 days.

(21) Appl. No.: 10/952,764

(22) Filed: Sep. 30, 2004

(65) Prior Publication Data

US 2006/0052574 A1   Mar. 9, 2006

(30) Foreign Application Priority Data

May 10, 2004   (KR) .................. 10-2004-0032606

(51) Int. Cl.
*C08K 3/40* (2006.01)
(52) U.S. Cl. ..................... 524/115; 8/405; 502/150; 502/208; 524/494; 528/176; 528/190; 528/192; 528/193
(58) Field of Classification Search .............. 8/405; 502/150, 208; 524/115, 494; 528/176, 190, 528/192, 193
See application file for complete search history.

(56) References Cited

FOREIGN PATENT DOCUMENTS

| JP | 09095870 | * | 4/1997 |
|---|---|---|---|
| WO | WO 2004/014983 | * | 2/2004 |

* cited by examiner

*Primary Examiner*—Terressa Boykin
(74) *Attorney, Agent, or Firm*—Lowe Hauptman Ham & Berner LLP

(57) ABSTRACT

Disclosed is a flame-retardant polyester polymer dyeable with a cationic dye, a method of producing the same, a copolyester fiber using the same, and fiber products using the copolyester fiber. In the method, after a dimethyl isophthalate component containing metal sulfonate of Formula 2 separately reacts with ethylene glycol so that an extent of the ester interchange reaction is 95% or more to synthesize bis(hydroxyethyl terephthalate) containing metal sulfonate of Formula 3, bis(hydroxyethyl terephthalate) is fed so that a content of bis(hydroxyethyl terephthalate) is 0.01-5 mol % based on a diacid component in a polymer in a course of producing polyester, a phosphorus-based flame retardant of Formula 1 is fed so that a content of a phosphorus atom is 500-40000 ppm based on the polymer, and the mixture is copolymerized. The polyester polymer is dyeable with cationic dye while having excellent flame retardancy, and can be melt-spun like other polymers capable of being melt-spun. The copolyester fiber using the polyester polymer is capable of being processed according to processes through which conventional polyester fibers are processed, and is dyeable with cationic dye while having excellent flame retardancy.

9 Claims, No Drawings

FLAME-RETARDANT POLYESTER POLYMER DYEABLE WITH CATIONIC DYE, METHOD OF PRODUCING THE SAME, AND COPOLYESTER FIBER USING THE SAME

BACKGROUND OF THE INVENTION

1. Field of the Invention

The present invention relates to a flame-retardant copolyester polymer dyeable with a cationic dye, a method of producing the same, and a copolyester fiber using the same. The copolyester polymer includes terephthalic acid (hereinafter, referred to as "TPA") as a raw material, and thus, it has excellent dyeability due to the cationic dye under atmospheric pressure while assuring excellent intrinsic physical properties of poly(ethylene terephthalate) (hereinafter, referred to as "PET"), has an increase of pack pressure, considered as a cause of reduction in spinnability during a spinning process, that is similar to that of conventional polyester, and has excellent flame retardancy.

More particularly, the present invention pertains to a method of producing a copolyester, which is capable of being dyed using a cationic dye under atmospheric pressure, assures a slow increasing speed of pack pressure because contents of foreign materials, such as unreacted materials, increasing the pack pressure in a polymer, are very low, resulting in excellent processability, and has a limited oxygen index (hereinafter, referred to as "LOI") of 26 or more as a standard of flame retardancy in the course of producing a fiber. Additionally, unlike conventional PET, the polymer of the present invention can be dyed by cationic dye, can have vivid colors, and can assure a two tone effect after the dyeing when it is used in conjunction with a typical flame-retardant copolyester fiber, and thus, the polymer of the present invention having excellent flame retardancy and dyeability can be used in various applications.

2. Description of the Prior Art

A PET fiber is a polymer material, which has excellent mechanical properties and resistances to chemicals and environments, thereby being usually applied to fibers for clothes, industrial fibers, and films. However, even though it has some advantages, in the case of employing it as the fibers for clothes, since it has no functional groups affecting the dyeing, it can be dyed using only a disperse dye at high temperature and pressure. Accordingly, many studies have been conducted to improve dyeability by copolymerization using ionic materials.

Additionally, since the PET fiber having the LOI of 20-22 combusts in atmospheric air, it is problematic in terms of stability. With respect to this, studies have been conducted to improve flame retardancy according to a growing demand for flame retardancy in advanced countries, such as Europe and America.

The above studies are as follows.

1. The Improvement in the Dyeability by Copolymerization Using the Ionic Materials WO 99/09238 discloses a method of producing a copolyester dyeable by a cationic dye, in which an ester-forming sulfonate compound is copolymerized in a copolymerizing ratio of 0.5-5 mol %, and which adopts a DMT process. However, the DMT process is disadvantageous in terms of productivity and production costs in comparison with a TPA process, and in practice, when it is applied to TPA polymerization devices usually used in most polyester enterprises, spinning efficiency is reduced because of the large amount of unreacted materials.

2. The Improvement in the Flame Retardancy

A method of giving the flame retardancy to a polyester fiber is classified into a first method, in which a surface of a fiber is treated with a flame retardant, a second method, in which a flame retardant material is used during a spinning process, and a third method, in which copolymerization is conducted with the use of a flame retardant material. The first method has a disadvantage of poor durability even though it is advantageous in terms of production costs. The second method includes a blend-spinning method employing a flame retardant material (flame retardant) and another blend-spinning method employing a flame-retardant master batch, which contains an excess amount of flame retardant, but the former is problematic in that spinnability and physical properties of a grey yarn are reduced, and the latter has disadvantages in that it is difficult to produce the flame-retardant master batch so that it has desired physical properties, such as viscosity and color. The third method relates to the production of flame-retardant polyester through copolymerization, and has advantages in that flame-retardant polyester has desired durability and the third method is similar to a typical method of producing polyester. A halogen-based flame retardant (mostly consisting of bromine(Br)-based flame retardant) and a phosphorus(P)-based flame retardant are usually used in the course of producing flame-retardant polyester.

Use of the bromine-based flame retardant is disclosed in Japanese Pat. Laid-Open Publication Nos. Sho.62-6912, Sho.53-46398, and Sho.51-28894, in which, since bromine-based compounds are easily decomposed by heat at high temperatures, a great amount of flame retardant must be used to obtain desired flame retardancy, and thus, the above patents are problematic in that colors of polymers deteriorate, resistance to light is reduced, and toxic gases are generated during combustion.

Furthermore, use of the phosphorus-based flame retardant is disclosed in U.S. Pat. Nos. 3,941,752, 5,399,428, and 5,180,793, and Japanese Pat. Laid-Open Publication No. Sho.50-56488, in which, in the case of the reactive flame retardant, since a phosphorus atom having a flame-retardant function is bonded to a main chain of a polymer, physical properties are reduced due to hydrolysis in the course of post-processing a polyester fiber, particularly dyeing it. Additionally, Japanese Pat. Laid-Open Publication No. Sho.52-47891 discloses the production of flame-retardant polyester, in which a phosphorus-based flame retardant is used in a predetermined stage of an ester interchange reaction and a polycondensation reaction. However, in the case of employing dimethyl terephthalate (hereinafter, referred to as "DMT") as a raw material, there are some problems that production costs are high in comparison with that of a terephthalic acid (hereinafter, referred to as "TPA") process and a polymer produced through this Japanese patent is degraded by UV.

As described above, conventionally, studies have been conducted to improve the dyeability and to provide flame retardancy by copolymerization of the ionic materials. Recently, there is a growing need to add flame retardancy to intrinsic physical properties according to a growing demand for bedclothes, interior fiber products, and clothes having flame retardancy in advanced countries.

A method of physically blending a flame-retardant polyester polymer and a polyester polymer dyeable with a cationic dye during a spinning process may be suggested to produce a flame-retardant fiber dyeable with a cationic dye, to be provided by the present invention. However, this method is problematic in that since a copolyester fiber produced according to the method includes two polymers simply blended with each other, a content of phosphorus, acting as the flame retardant, is reduced, and thus, the desired flame retardancy is not assured, and that since a content of the ionic materials, which provide dyeability by the cationic dye, is reduced, the dyeability by the cationic dye is reduced due to a reduction in spaces to be dyed by the cationic dye. Additionally, it is difficult to precisely regulate contents of the flame retardant and ionic materials, and to uniformly disperse them, resulting in nonuniform physical properties of a grey yarn.

SUMMARY OF THE INVENTION

Therefore, an object of the present invention is to provide a polyester polymer, which has excellent dyeability and flame retardancy, and assures excellent processability and mechanical properties by providing simultaneously dyeability by a cationic dye and flame retardancy to one polymer, and a fiber produced using the same.

The above object can be accomplished by providing a method of producing a flame-retardant polyester polymer dyeable with a cationic dye, which includes synthesizing bis(hydroxyethyl terephthalate) containing a metal sulfonate of Formula 3, feeding bis(hydroxyethyl terephthalate) so that a content of bis(hydroxyethyl terephthalate) is 0.01-5 mol % based on a diacid component in a polymer in a course of producing polyester, feeding a phosphorus-based flame retardant of Formula 1 so that a content of a phosphorus atom is 500-40000 ppm based on the polymer, and copolymerizing a mixture, where a material of Formula 3 is produced by reacting a material of Formula 2 with ethylene glycol in an extent of reaction of 95% or more.

Formula 1

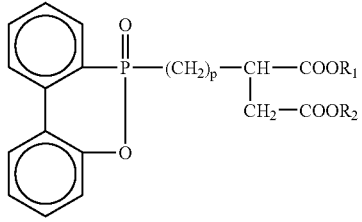

($R_1$ and $R_2$ are radicals, which each have a reactive group capable of forming an ester group and 2-4 carbons, and p is an integer ranging from 1 to 5)

Formula 2

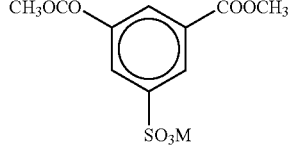

(wherein, M is an alkaline metal, including Na, Li, or K)

Formula 3

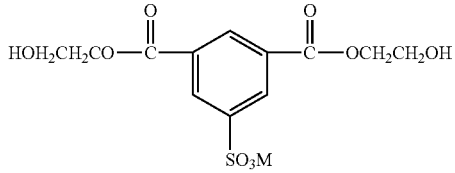

(wherein, M is an alkaline metal, including Na, Li, or K).

DETAILED DESCRIPTION OF THE INVENTION

Hereinafter, a detailed description will be given of the present invention.

1. An Improvement in Flame Retardancy

The present inventors developed a flame-retardant copolyester using a flame retardant, expressed by Formula 1, to improve the flame retardancy. The reason for use of the flame retardant of Formula 1 is that a phosphorus-based flame retardant is used instead of a halogen-based flame retardant in consideration of environmental effects, and since it must be copolymerized with polyester in order to produce a permanent flame-retardant yarn, which assures excellent processability, it is necessary to use a bifunctional flame retardant, and the flame retardant of Formula 1 is most suitable as the bifunctional flame retardant among phosphorus-based compounds.

The present inventors have conducted studies into an improvement of UV stability, resulting in the finding that manganese phosphate serves to improve the UV stability of flame-retardant polyester. However, in the case of directly using a manganese compound, coagulation occurs, thereby forming a great number of foreign substances in a polymer, resulting in increased pack pressure during a spinning process, and since the manganese compound is not dissolved in ethylene glycol as a raw material in polymerization of PET, there is difficulty in feeding it. Hence, the present inventors selected a method of generating the manganese compound in the course of the polymerization. In this regard, feeding of manganese salts and phosphorus-based compounds is conducted separately.

2. Provision of Dyeability by a Cationic Dye

In WO 99/09238, an ester-forming sulfonate compound is copolymerized in a copolymerizing ratio of 0.5-5 mol % to produce a copolyester and a fiber is produced using it. However, the present inventors applied polymerization conditions of the above patent to a TPA process, resulting in the finding that in the case of using TPA and monomers for copolymerization used in WO 99/09238, pack pressure is rapidly increased during a spinning process due to unreacted materials, causing reduced spinning efficiency.

The reason for the above description was analyzed by the present inventors, they were able to see that it was caused by different reactivities of raw materials. That is to say, TPA reacts with ethylene glycol (hereinafter, referred to as "EG") without a catalyst, but since a reaction of the monomers according to WO 99/09238 is conducted by an ester interchange reaction, a great amount of unreacted materials is formed.

Hence, the present inventors have conducted studies on a method of producing a copolyester, which contains a low content of unreacted materials by using dimethyl isophthalate (hereinafter, referred to as "DMS") containing a metal sulfonate group of Formula 2.

The present inventors conducted the reaction of DMS in a separate state from EG to produce bis(hydroxyethyl terephthalate) (hereinafter, referred to as "DES") containing a metal sulfonate group of Formula 3, and fed the resulting product into a reaction bath, thereby reducing the content of unreacted materials. A detailed description will be given of production conditions.

Examples of a catalyst useful to produce DES using DMS as a raw material may include any metal salt frequently used as a catalyst of the ester interchange reaction. It may be exemplified by alkaline metals and alkaline earth metals on the periodic table, hydroxide of titanium, vanadium, manganese, chromium, cobalt, aluminum, zinc, germanium, and zirconium, acetates thereof, and alkoxides thereof.

Particularly, it is preferable to use hydroxides, acetates, and alkoxides of sodium, potassium, lithium, magnesium, manganese, zinc, and a content of each of them is preferably 0.01-20 wt % based on DMS. Compounds used as the catalyst for ester interchange reaction serve to reduce acidity of a polymerization system when they are used in a basic state in the copolymerization, thereby suppressing generation of ether byproduct, and thus, it is not necessary to separately use an inhibitor for suppressing the generation of ether byproduct. When the content is less than 0.01 wt %, the ester interchange reaction does not occur, and when the content is more than 20 wt %, production costs are increased and the catalyst acts as a foreign substance in a final polymer even though the reaction rate is fast, thereby reducing the purity of the polymer.

Meanwhile, in the course of polymerizing polyester, a melting point and a glass transition temperature are reduced by the ether byproduct, thereby reducing thermal stability of the polymer, resulting in fusing during a drying process. The ether byproduct generated as a side-product in a copolyester is diethylene ether glycol (hereinafter, referred to as "DEG"), and its generation is caused by high acidity of TPA, DMS and/or DES.

Therefore, use of the inhibitor may be considered to reduce the acidity. However, since use of the inhibitor brings about the reduced purity of the polymer, the present inventors used a material for suppressing the generation of the ether byproduct as the catalyst employed to produce DES using DMS, and thus, it was not necessary to additionally use the inhibitor. According to the present invention, the preferable content of the ether byproduct is 0.1-5 wt %. When the content is less than 0.1 wt %, thermal stability of the polymer is excellent, but it is very difficult to suppress the generation of the ether byproduct, inevitably generated in the course of polymerizing the copolyester. When the content is more than 5 wt %, the thermal stability of the polymer is significantly reduced, resulting in reduced spinnability and processability of the products employing a grey yarn.

Furthermore, 5 wt % or less polyalkylene ether glycol with a molecular weight of 1000-20000 is used based on the polymer in order to prevent reduction of spinning efficiency caused by an increase of the melting point of the polymer due to copolymerization of DMS and/or DES, and examples of polyalkylene ether glycol include poly(ethylene ether)glycol (hereinafter, referred to as "PEG"), poly(propylene ether) glycol (hereinafter, referred to as "PPG"), poly(tetramethylene ether)glycol (hereinafter, referred to as "PTMG"), and a copolymer of PEG and PPG. Particularly, it is preferable to use PEG and PPG.

As well, since the polymer according to the present invention is used to produce fibers for clothes and industrial fibers, titanium dioxide is used in an amount of 5 wt % or less as a matting agent. Generally, the polymer is considered superbright when the amount of titanium dioxide is 0, bright when the amount is 300 ppm, semi-dull when the amount is 0.3 wt %, and fully dull when the amount is 2-3 wt %. According to this, the polymer and grey yarn of the present invention are classified.

Additionally, in the case of using the TPA process employing TPA as a raw material, 5 wt % or less isophthalic acid may be used to increase the extent of an esterification reaction. It is preferable that the amount of TPA is 5 wt % or less to lengthen a filter changing cycle for oligomers during the polymerization process, and when the amount of TPA is more than 5 wt %, the melting point of the polymer is very low, resulting in reduced processability of a post-process, such as a false twisting process, and thus, it is difficult to apply the polymer to various types of fibers.

3. Production Method

According to the results of tests conducted by the present inventors, when the flame retardant and ionic materials are simultaneously fed into a polycondensation reaction bath, a content of an additive is excessively increased, thereby increasing an amount of EG contained in the ionic materials or flame retardant, resulting in reduced processability of the polymerization due to an increased load of a reactor.

Hence, the present inventors found that when the flame retardant of Formula 1 and the ionic materials of Formula 3 are fed into two different reaction baths selected from the group consisting of a slurry precipitation bath, an esterification bath, and a polycondensation bath, the load of the reactor is reduced, resulting in increased productivity.

In other words, the flame retardant of Formula 1 and the ionic materials of Formula 3, which, after the esterification reaction is completed may be fed into any of the slurry precipitation bath, esterification bath (DE reaction bath), or polycondensation bath (PC reaction bath), react easily. However, it is preferable to feed the ionic material of Formula 3 into the slurry precipitation bath or esterification bath, and to feed the flame retardant of Formula 1 into the polycondensation bath after the esterification in consideration of the quality of the polymer.

The reason for use of the specific bath is that a basic ester interchange catalyst is used in the course of producing the ionic materials of Formula 3 from a material of Formula 2, and the basic ester interchange catalyst functions to reduce acidity of the esterification bath, in which most of DEG is produced, in the course of producing the copolyester, thereby positively contributing to suppression of the generation of DEG. Furthermore, if the flame retardant of Formula 1 is not subjected to an esterification reaction, acidity of base oligomers remaining in the esterification bath is increased during a semi-batch polymerization adopting the TPA process, and thus, the content of DEG may be increased continuously. Accordingly, in the present invention employing a great amount of additive, it is preferable that the flame retardant of Formula 1 is subjected to the esterification reaction and then used during the polymerization.

As for the content of the phosphorus-based flame retardant of Formula 1, it is preferable that the content of a phosphorus atom in the flame retardant is 500-40000 ppm based on the polymer. When the content is less than 500 ppm, a flame retardancy effect is negligible, and when the content is more than 40000 ppm, the flame retardancy is excellent, but production costs are increased, physical properties of the polymer and fiber are significantly reduced, and pack pressure is increased due to unreacted materials.

As well, the content of a manganese salt used as an UV stabilizer is preferably 0.1-500 ppm, and more preferably 0.2-200 ppm based a manganese atom in the polymer. When the content is less than 0.1 ppm, it is difficult to obtain the desired UV stability, and when the content is more than 500 ppm, dispersion is poor, resulting in increased pack pressure during a spinning process. Furthermore, as for the content of the phosphorus-based compound used in conjunction with the manganese salt, it is preferable that the content of the phosphorus atom is 0.1-500 ppm based on the polymer. More preferably, the content is 0.2-200 ppm. When the content is less than 0.1 ppm, it is difficult to obtain the desired UV stability, and when the content is more than 500 ppm, a catalytic activity is reduced, and thus, it is difficult to produce desired flame-retardant polyester.

When a dimethyl isophthalate component containing metal sulfonate of Formula 2 separately reacts with ethylene glycol to produce bis(hydroxyethyl terephthalate) containing metal sulfonate of Formula 3, an extent of the ester interchange reaction must be 95% or more. When the extent of the ester interchange reaction is not 95% or more, the unreacted materials remain, resulting in increased pack pressure.

Furthermore, it is preferable that the content of DES of Formula 3 is 0.01-5 mol % based on total diacid in the polymer. When the content is less than 0.01 mol %, dyeability by a cationic dye is reduced, and when the content is more than 5 mol %, production costs are significantly increased and a melting viscosity is very high, and thus, processability is poor and physical properties of the fiber are reduced.

Hereinafter, a description will be given of terms and analysis, to be used in examples of the present invention.

1. Content of unreacted DMS: the resulting polymer is subjected to an extraction process using methanol and a Soxhlet device for 12 hours, and the unreacted DMS and DMS in which only ester at one side is reacted, (hereinafter, referred to as "m-DMS") are quantitatively analyzed using liquid chromatography (LC).

2. IV: the resulting polymer is dissolved in a solution, which includes phenol and 1,1,2,2-tetrachloroethane mixed with each other in a weight ratio of 60/40, and IV is then measured in a desiccator at 30° C. using a Ubbellohde tube.

3. DEG content: the resulting polymer is hydrolyzed with monoethanol amine, and then analyzed using gas chromatography (GC).

4. Carboxylic end group (hereinafter, referred to as "CEG"): the resulting polymer is dissolved in benzyl alcohol, and then subjected to reverse titration analysis using a KOH solution.

5. Melting point: Peaks are analyzed within a melting range using DSC 7 manufactured by Perkin Elmer Inc. while the polymer is heated at a heating rate of 10° C./min.

6. Increase in the pack pressure: A time required to increase the pack pressure by 100 kgf from an initial pack pressure is recorded while a pressure gauge installed in a spinning machine is observed.

7. Dyeability: the resulting grey yarn is circular-knitted, dyed with a Golden Yellow GL dye, manufactured by Dyestar Co. Ltd., at 100° C., and observed with the naked eye.

8. UV stability: after the resulting polymer is shaped into a film using a hot press and exposed to a UV lamp for 20 hours, the intrinsic viscosity of the polymer is measured and intrinsic viscosity retention is evaluated.

9. Hydrolysis stability: after the spun grey yarn is processed at 130° C. for 3 hours under predetermined pressure, tenacity retention is evaluated.

10. Flame retardancy: after the resulting grey yarn is knitted, scoured, reduced in weight, and dyed, the flame retardancy is evaluated using a limited oxygen index (LOI, KS M 3032, B-1) and a 45 degree inclination method frequently used as a method of evaluating fire-resistance of medical fibers (KS K 0580).

Having generally described this invention, a further understanding can be obtained by reference to certain specific examples and comparative examples which are provided herein for purposes of illustration only and are not intended to be limiting unless otherwise specified.

EXAMPLE 1

After DMS, in which M was Na, was dissolved in EG in a reactor provided with a methanol discharging unit so that a content of DMS was 60%, 5 wt % of sodium hydroxide (NaOH) was added as a catalyst for an ester interchange reaction to the resulting solution based on DMS, thereby initiating a reaction. When the content of discharged methanol exceeded 99% of a theoretical value, heating was stopped and the reactor was cooled to produce DES.

Slurry was prepared using DES so that a molar ratio of DES/(TPA+DES) was 1.5, and in this case, a molar ratio of EG to all acid components (TPA+DES) was 1.15.

Base oligomers having the same composition as the slurry were agitated at 255° C. in an esterification bath, and the slurry was fed into the esterification bath while an inside temperature of the reactor was maintained at 255° C. After the completion of feeding of the slurry, the agitation was continued for 30 min, when an extent of the esterification was 95%, the resulting slurry was moved to a polycondensation bath. A flame retardant, including hydroxy ethyl groups ($CH_2CH_2OH$) as $R_1$ and $R_2$ in Formula 1, was fed into the polycondensation bath so that the content of a phosphorus atom contained in the flame retardant was 6100 ppm, manganese acetate was fed as a manganese salt into the polycondensation bath so that the content of a manganese atom was 11 ppm, phosphoric acid was fed as a phosphorus-based compound into the polycondensation bath so that the content of a phosphorus atom was 15 ppm, and antimony trioxide dissolved in an amount of 2 wt % in EG was fed as a catalyst into the polycondensation bath so that its content was 350 ppm based on a polymer. Subsequently, the polycondensation bath was left in a high vacuum, the vacuum was destroyed 200 min after the vacuum started to be created, and the resulting polymer was discharged from the polycondensation bath, thereby gaining chips with an IV of 0.61 dl/g.

After a fiber of 75d/36f was produced from the resulting polymer using typical melt-spinning devices under conditions where a spinning temperature was 288° C., a speed of a first godet roller at 88° C. was 1350 m/min, and a speed of a second godet roller at 130° C. was 4000 m/min, the fiber was circular-knitted and dyed with a Golden Yellow GL dye, manufactured by Dyestar Co. Ltd., to evaluate dyeability.

Physical properties of the polymer and grey yarn are described in Table 1.

EXAMPLE 2

After DMS, in which M was Na, was dissolved in EG in a reactor provided with a methanol discharging unit so that a content of DMS was 60%, 5 wt % of sodium hydroxide (NaOH) was added as a catalyst for an ester interchange reaction to the resulting solution based on DMS, thereby initiating a reaction. When the content of discharged methanol exceeded 99% of a theoretical value, heating was stopped and the reactor was cooled to produce DES.

Slurry was prepared using DES so that a molar ratio of DES/(TPA+DES) was 1.2, and in this case, a molar ratio of EG to all acid components (TPA+DES) was 1.15.

Base oligomers having the same composition as the slurry were agitated at 255° C. in an esterification bath, and the slurry was fed into the esterification bath while an inside temperature of the reactor was maintained at 255° C. After the completion of feeding of the slurry, the agitation was continued for 30 min, when an extent of the esterification was 95%, the resulting slurry was moved to a polycondensation bath. A flame retardant, including hydroxy ethyl groups ($CH_2CH_2OH$) as $R_1$ and $R_2$ in Formula 1, was fed into the polycondensation bath so that the content of a phosphorus atom contained in the flame retardant was 6500 ppm, manganese acetate was fed as a manganese salt into the polycondensation bath so that the content of a manganese atom was 55 ppm, phosphoric acid was fed as a phosphorus-based compound into the polycondensation bath so that the content of a phosphorus atom was 50 ppm, and antimony trioxide dissolved in an amount of 2 wt % in EG was fed as a catalyst into the polycondensation bath so that its content was 350 ppm based on a polymer. Subsequently, the polycondensation bath was left in a high vacuum, the vacuum was destroyed 200 min after the vacuum started to be created, and the resulting polymer was discharged from the polycondensation bath, thereby gaining chips with an IV of 0.63 dl/g.

After a fiber of 75d/36f was produced from the resulting polymer using typical melt-spinning devices under conditions where a spinning temperature was 288° C., a speed of a first godet roller at 88° C. was 1350 m/min, and a speed of a second godet roller at 130° C. was 4000 m/min, the fiber was circular-knitted and dyed with a Golden Yellow GL dye, manufactured by Dyestar Co. Ltd., to evaluate dyeability.

Physical properties of the polymer and grey yarn are described in Table 1.

EXAMPLE 3

Slurry was prepared so that a molar ratio of EG/TPA was 1.15.

A molar ratio of DES/(TPA+DES) was maintained at 1.5, a DE reaction bath was maintained at 255° C. with the agitation, and the agitation was continued for 30 min after the slurry and DES were sequentially fed into the DE reaction bath. The feeding of the slurry and DES was conducted in such a way that their amounts were controlled so that the molar ratio of DES/(TPA+DES) was 1.5, and the reaction was then continued for 30 min, thereby an extent of the reaction approached 95.2%.

The, resulting product was moved to a polycondensation bath, a flame retardant, including hydroxy ethyl groups ($CH_2CH_2OH$) as $R_1$ and $R_2$ in Formula 1, was fed into the polycondensation bath so that the content of a phosphorus atom contained in the flame retardant was 6100 ppm, manganese acetate was fed as a manganese salt into the polycondensation bath so that the content of a manganese atom was 55 ppm, phosphoric acid was fed as a phosphorus-based compound into the polycondensation bath so that the content of a phosphorus atom was 50 ppm, and antimony trioxide dissolved in an amount of 2 wt % in EG was fed as a catalyst into the polycondensation bath so that its content was 350 ppm based on a polymer. Subsequently, the polycondensation bath was left in a high vacuum, the vacuum was destroyed 200 min after the vacuum started to be created, and the resulting polymer was discharged from the polycondensation bath, thereby gaining chips with an IV of 0.62 dl/g.

Physical properties of the polymer and grey yarn were evaluated in the same manner as example 1, and the results are described in Table 1.

EXAMPLE 4

The procedure of example 1 was repeated except that 0.3 wt % of titanium dioxide was used based on a polymer, and the results are described in Table 1.

EXAMPLE 5

The polymer produced according to example 1 was spun under conditions where first and second godet rollers were not heated, speeds of the first and second godet rollers were 3280 m/min and 3300 m/min, a draw ratio was 1.67, and a temperature of a heater was 160° C., and was subjected to a false-twisting process using a belt-type false twister to produce a grey yarn of 75d/36f.

Physical properties of the polymer and grey yarn are described in Table 1.

COMPARATIVE EXAMPLE 1

The procedure of example 1 was repeated except that a manganese salt and phosphoric acid were not used.

COMPARATIVE EXAMPLE 2

The procedure of example 1 was repeated except that a flame retardant (Formula 1) was not used, and the results are described in Table 1.

COMPARATIVE EXAMPLE 3

The procedure of example 1 was repeated except that isophthalic acid containing a metal sulfonate group, such as DMS and DES, was not used, and the physical property results are described in Table 1.

COMPARATIVE EXAMPLE 4

The procedure of example 1 was repeated except that DMS was used instead of DES, and the physical property results are described in Table 1.

COMPARATIVE EXAMPLE 5

The procedure of example 1 was repeated except that polymerization was conducted so that a content of DES was 6 mol % based on acidic components including TPA+flame retardant+DES in a polymer, and a content of a phosphorus atom in the flame retardant was 51000 ppm in the case of a content of the flame retardant. The polymer was discharged from a PC bath after polymerization for 400 min, and an IV of the polymer was nothing but 0.36 dl/g, and thus, it was impossible to apply the polymer to produce a grey yarn.

COMPARATIVE EXAMPLE 6

Flame-retardant PET chips, which contained 10000 ppm of phosphorus and had an IV of 0.65, and PET chips, which contained 1.2 mol % of DES, had an IV of 0.55, and were dyeable with a cationic dye, were blended with each other in a weight ratio of 50:50. After a fiber of 75d/36f was produced from the blend using typical melt-spinning devices under conditions where a spinning temperature was 288° C., a speed of a first godet roller at 88° C. was 1350 m/min, and a speed of a second godet roller at 130° C. was 4000 m/min, the fiber was circular-knitted and dyed with a Golden Yellow GL dye, manufactured by Dyestar Co. Ltd., to evaluate dyeability.

Blow-out frequently occurred due to nonuniform mixing in the spinning, resulting in poor processability, and when the fiber was knitted and dyed, the resulting fiber had a light color and streaky dyeing defects.

COMPARATIVE EXAMPLE 7

Slurry was prepared by simultaneously using DES produced according to example 1 and the flame retardant used in example 1 so that a molar ratio of DES/(TPA+DES+flame retardant) was 1.5 and a molar ratio of EG/(TPA+DES+flame retardant) was 1.2. The flame retardant was prepared so that a content of a phosphorus atom was 6000 ppm based on a polymer.

Viscosity of the slurry was very high, making feeding of the slurry impossible, and thus, it was impossible to conduct polymerization.

COMPARATIVE EXAMPLE 8

The flame retardant and DES according to example 1 were simultaneously fed into a DE bath in order to reduce slurry viscosity. Contents of DES and flame retardant in a polymer were the same as those of comparative example 7. A recovery column was loaded (increase in vapor pressure in the recovery column) due to an excessive amount of EG vapor, and thus, it was difficult to smoothly remove $H_2O$, and a polycondensation reaction was not conducted because an extent of esterification was reduced due to a delayed DE reaction, and thus, it was impossible to normally produce the polymer.

COMPARATIVE EXAMPLE 9

The procedure of example 1 was repeated except that a flame retardant was added to slurry and DES was fed into a polycondensation bath. At this time, contents of DES and flame retardant were the same as those of example 1. Since a content of DEG in a polymer was continuously increased in such a way that the content was 2.1 wt %, 2.8 wt %, and 3.9 wt % in first, second, and third batches, respectively, it was impossible to control the content of DEG, and thus, it was impossible to use the resulting polymer because of poor quality and nonuniformity of the resulting polymer.

COMPARATIVE EXAMPLE 10

Polymerization was conducted using a flame retardant, including H (hydrogen atom) as $R_1$ and $R_2$ in Formula 1, according to the same procedure as example 1.

When the polymerization was carried out according to a semi-batch polymerization method adopting a TPA process, since a content of DEG in a polymer was continuously increased in such a way that the content was 2.3 wt %, 3.2 wt %, and 4.7 wt % in first, second, and third batches, respectively, it was impossible to control the content of DEG, and thus, it was impossible to use the resulting polymer because of poor quality and nonuniformity of the resulting polymer.

Unlike conventional PET, which has the excellent physical properties of polyester but is capable of being dyed with only a disperse dye, a polymer according to the present invention is advantageous in that it can be dyed with a cationic dye, resulting in excellent dyeability, it has a slow increasing speed of pack pressure because contents of foreign materials, such as unreacted materials, that increase the pack pressure in a polymer, are very low, resulting in excellent processability, and it has excellent flame retardancy. Accordingly, the polymer of the present invention can assure a two tone effect after the dyeing when it is used in conjunction with a typical flame-retardant copolyester fiber, and thus, it can be used in various applications because of excellent flame retardancy and dyeability.

What is claimed is:

1. A method of producing a flame-retardant polyester polymer, which is dyeable with a cationic dye, comprising:
   synthesizing bis(hydroxyethyl terephthalate) containing a metal sulfonate of Formula 3;
   feeding bis(hydroxyethyl terephthalate) so that a content of bis(hydroxyethyl terephthalate) is 0.01-5 mol % based on a diacid component in a polymer in a course of producing polyester;
   feeding a phosphorus-based flame retardant of Formula 1 so that a content of a phosphorus atom is 500-40000 ppm based on the polymer; and
   copolymerizing a mixture,
   wherein, a material of Formula 3 is produced by reacting a material of Formula 2 with ethylene glycol in an extent of reaction of 95% or more

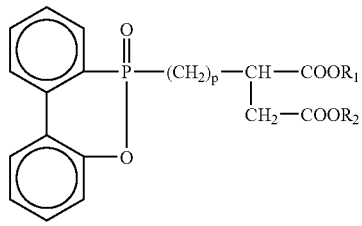

Formula 1

TABLE 1

|  | Ex.1 | Ex.2 | Ex.3 | Ex.4 | Ex.5 | Co. Ex. 1 | Co. Ex. 2 | Co. Ex. 3 | Co. Ex. 4 |
|---|---|---|---|---|---|---|---|---|---|
| Polymer IV(dl/g) | 0.61 | 0.63 | 0.62 | 0.60 | 0.61 | 0.61 | 0.58 | 0.64 | 0.60 |
| Unreacted DMS (wt %) | 0.01 | 0.01 | 0.01 | 0.01 | 0.01 | 0.01 | 0.01 | 0.01 | 0.57 |
| DEG (wt %) | 3.69 | 3.42 | 3.61 | 3.70 | 3.58 | 3.78 | 2.69 | 2.71 | 2.83 |
| CEG(meq/Kg KOH) | 53 | 49 | 54 | 58 | 57 | 51 | 53 | 49 | 52 |
| Melting point | 228.3 | 229.4 | 228.1 | 227.6 | 228.7 | 226.8 | 228.3 | 232.6 | 227.6 |
| Increase in pack pressure (day) | 7 | 7 | 7 | 7 | 7 | 7 | 7 | 7 | 2 |
| Tenacity (g/d) | 4.38 | 4.39 | 4.41 | 4.37 | 4.28 | 4.35 | 4.32 | 4.36 | 4.42 |
| Elongation (%) | 36 | 37 | 35 | 33 | 29 | 35 | 32 | 33 | 32 |
| Dyeability | [1]Ex. | [1]Ex. | [1]Ex. | [1]Ex. | [1]Ex. | [1]Ex. | [1]Ex. | [2]Con. | [1]Ex. |
| UV stability (%) | 98 | 99 | 98 | 94 | 97 | 82 | 94 | 96 | 97 |
| Flame retardancy (LOI | 30 | 32 | 31 | 31 | 30 | 29 | 20 | 31 | 32 |

[1]Ex.: excellent
[2]Con.: contaminated (impossible to be dyed)

($R_1$ and $R_2$ are radicals, which each have a reactive group capable of forming an ester group and 2-4 carbons, and p is an integer ranging from 1 to 5)

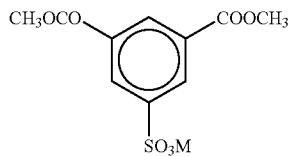

Formula 2

(wherein, M is an alkaline metal, including Na, Li, or K)

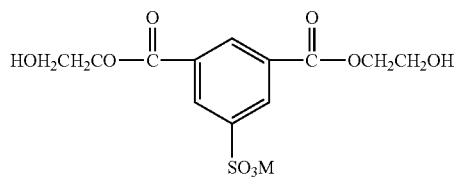

Formula 3

(wherein, M is an alkaline metal, including Na, Li, or K).

2. The method as set forth in claim 1, wherein titanium dioxide is fed in an amount of 5 wt % or less.

3. The method as set forth in claim 1, wherein a manganese salt is fed as an UV stabilizer so that a content of a manganese atom is 0.1-500 ppm based on the polymer, and a phosphorus-based compound is fed so that a content of a phosphorus atom is 0.1-500 ppm based on the polymer to form manganese phosphate in a polymerization system.

4. The method as set forth in claim 1, wherein the copolymerizing is conducted through a terephthalic acid (TPA) process employing terephthalic acid as a raw material.

5. A flame-retardant polyester polymer dyeable with a cationic dye produced according to any one of claims 1 to 4.

6. A flame-retardant polyester fiber dyeable with a cationic dye produced by melt-spinning the polymer according to claim 5.

7. A flame-retardant polyester polymer dyeable with a cationic dye produced according to claim 2.

8. A flame-retardant polyester polymer dyeable with a cationic dye produced according to claim 3.

9. A flame-retardant polyester polymer dyeable with a cationic dye produced according to claim 4.

* * * * *